F. W. EDWARDS.
SIGHT FEED ATTACHMENT FOR LUBRICATORS.
APPLICATION FILED SEPT. 20, 1911.
1,071,148.
Patented Aug. 26, 1913.
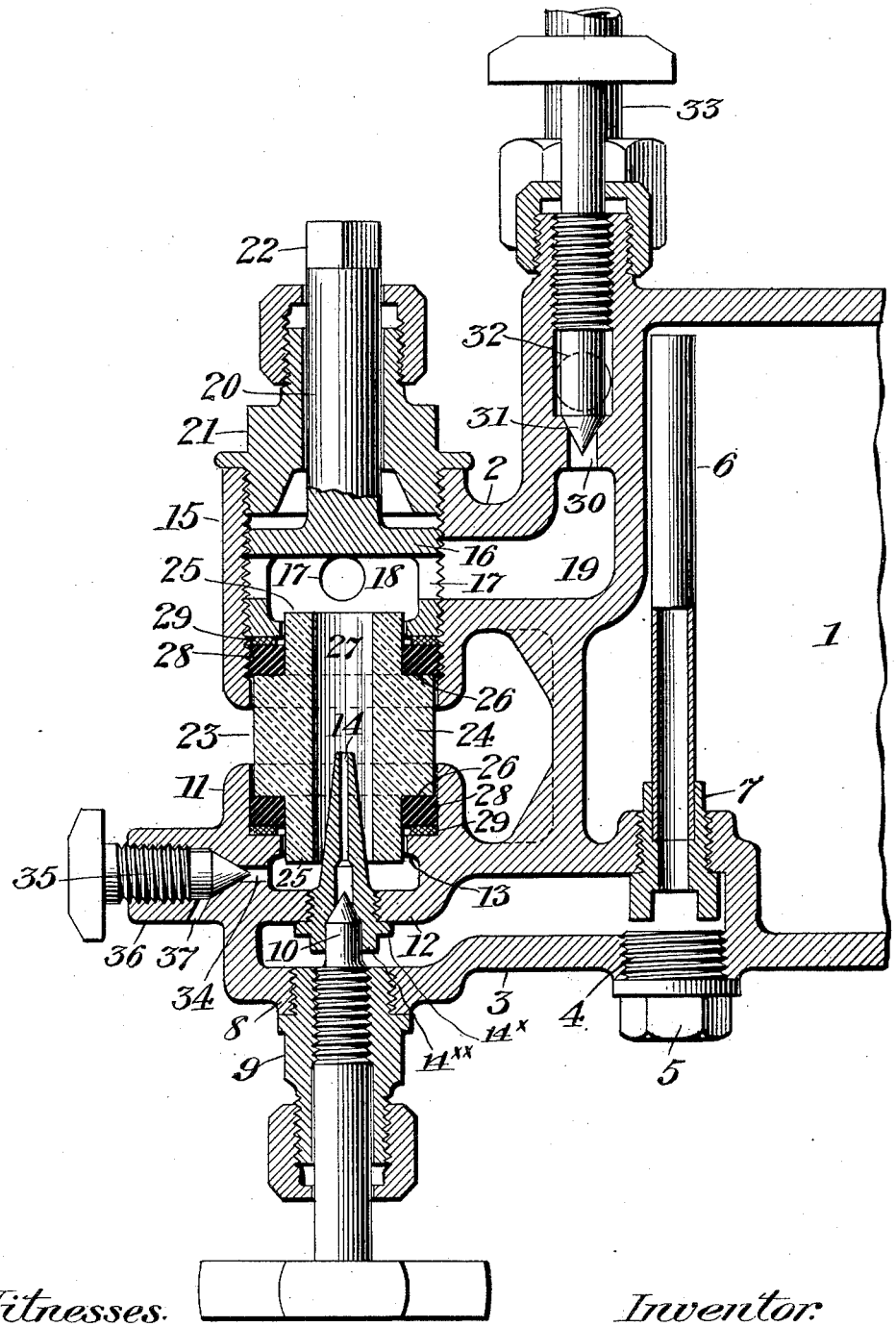
Witnesses.
D. W. Edelin
Lillie M. Perry
Inventor.
Frank W. Edwards
by W. W. Finckel
Atty.
COLUMBIA PLANOGRAPH CO., WASHINGTON, D. C.

UNITED STATES PATENT OFFICE.

FRANK W. EDWARDS, OF LOGANSPORT, INDIANA, ASSIGNOR TO THE CHICAGO LUBRICATOR COMPANY, OF CHICAGO, ILLINOIS, A CORPORATION OF ILLINOIS.

SIGHT-FEED ATTACHMENT FOR LUBRICATORS.

1,071,148.  Specification of Letters Patent.  Patented Aug. 26, 1913.

Application filed September 20, 1911. Serial No. 650,395.

*To all whom it may concern:*

Be it known that I, FRANK W. EDWARDS, a citizen of the United States, residing at Logansport, in the county of Cass and State of Indiana, have invented a certain new and useful Improvement in Sight-Feed Attachments for Lubricators, of which the following is a full, clear, and exact description.

This invention is in the nature of a modification of the inventions embraced in my application filed August 24, 1908, Serial No. 450,095, (Patent No. 1,009,290, dated November 21, 1911) and the division thereof filed of even date herewith Serial No. 650,394, entitled sight feed attachments for lubricators. In this case the lower feed-arm is made as in the divisional case referred to, excepting that the feed-tip is removable from the oil-cup instead of being integral therewith, with the advantage of less complication in casting, consequent economy, and capability of renewal.

An essential requirement in a sight-feed lubricator is that it shall permit such observations of the feed that the operator may determine whether the lubricator is feeding with the required regularity. To this end sight-feed lubricators have always been constructed with sight-feed chambers through which the oil passes drop by drop, the whole or some portion of the walls of these chambers being of glass. These glasses are usually called "observation glasses" and have been of two general types. In one of these types the glass is in the form of a tube of uniform diameter and having walls of uniform thickness, the oil passing through the tube. It is highly important that the sight-feed chamber should be so located as to be readily observable from various points of view about the lubricator, and more important still that its interior should be subjected to light and that its interior should be illuminated by the light coming from various directions and passing through the transparent walls of the chamber. This facility of observation has been secured in the old well-known tubular glass which is held at its ends in supporting arms usually provided with packing. While this form of glass was ideal in that it was so placed that the feed of oil could be observed from various positions, and also in that it permitted the light to enter the chamber from various directions, thus affording perfect illumination on the lubricator, yet it has certain inherent and radical defects which have never been overcome and for which heretofore no remedy has been proposed. These defects arose from the frequent breakage due to the fragile character of the tube itself, no such glass having been heretofore constructed of sufficient strength to withstand the internal steam pressures and the strains due to the variation of temperature and the getting out of line of the mountings. These glasses frequently broke, thus putting the lubricator out of service, and the danger from flying particles of glass was so serious as to cause the use of wire guards around the glasses, thus adding to the expense and interfering with ready observation. The other type of glasses is known as the bull's-eye. These glasses are invariably mounted in pockets, usually of metal, and fitted into the side walls of the sight-feed chambers. These glasses are solid and usually of greater axial length than diameter. The pockets or chambers containing the glasses are usually arranged in pairs, being placed in line with each other on opposite sides of the sight-feed chamber. These glasses largely overcome the liability of breakage, but they do not afford ready observation from different points, having, in fact, only small areas exposed to the light, and being for the most part surrounded by solid walls; and they cannot always be so placed as to permit the light to enter through both glasses or from opposite sides of the chamber. Further these glasses are so thick and their exposed areas so limited that they do not afford good illumination, and with turbid water the feed of the oil cannot be observed readily. These objections are so pronounced that it is generally recognized that the bull's-eye type of glass affords less facility for correct observation of the feed of the oil than the tubular glass, but these bull's-eyes have been and are used because of their avoidance of the objections to tubular glasses above stated.

In my Patents Nos. 952,515, 952,611 and 953,675, and in my application hereinabove referred to, I have shown a number of reinforced observation glasses which secure all of the advantages, without the defects, of both forms of glasses just referred to; that is to say, they insure complete illumination of the sight-feed, permit perfect observation, and combine strength and safety.

The present invention consists of a mounting specially designed for such glasses whereby the whole of their thick-walled portion is exposed unobstructedly, and in carrying out the invention, the upper and lower feed-arms of the lubricator oil-bowl are provided with flanges projecting therefrom in opposite directions and having a clear space between their adjacent edges, the observation glass being supported at opposite ends within these flanges and exposed to the light clear around in the space between said adjacent ends, and held in place fluid-tight by an adjustable follower in one of the feed-arms and suitable packing, the essential novel feature in this case being the removable oil-feed tip in the lower feed-arm. This feed tip is screwed into a hole made in the feed-tip cup, and said tip is made with a stop collar which abuts against the lower surface of the feed-tip cup in an oil-tight manner and serves to insure the proper placing of the tip. This feed-tip is inserted through an opening in the bottom of the lower feed arm which is provided with a removable hub carrying the oil feed valve, so that the feed-tip is always accessible without dismantling the feed.

In the accompanying drawing, illustrating the invention, the view is a vertical section of one end of a lubricator of approved construction, with the upper and lower feed-arms constructed to serve as such and also as a mounting for the sight-feed glass.

The oil-bowl 1 may be of approved construction and shape, and provided with any desired number of sight-feeds. For purposes of illustration it is supposed to be sufficient to describe the invention as applied to the feed-arms at one end of the oil-bowl, and which may be utilized to feed the lubricant to one of the engine cylinders. The upper feed-arm 2 and the lower feed-arm 3 are, preferably, cast with the oil-bowl. In the lower feed-arm is a bottom opening 4 closed by a plug 5. Through this opening is inserted into the oil-bowl the oil feed pipe 6 which is supported in a tubular nut 7 screwed into the upper wall of the lower feed-arm. The outer end of the lower feed-arm is made with an internally screw-threaded boss 8 on its bottom, in which is mounted the hub 9 into which is screwed the oil-feed valve 10. The top of this feed-arm is provided with an upstanding annular flange 11. Between the upper and lower portions of this lower feed-arm is a feed-tip cup 12 made integral with the feed-arm, and having the packing-receiving ledge or rim 13, above which is the upstanding annular flange 11 referred to. The cup 12 has an oil-feed tip 14 screwed into a suitable centrally arranged screwthreaded hole in it, and is so constructed that it may be readily inserted and removed; the removable hub 9 affording convenient access to such feed-tip.

The feed tip is made with a stop collar, shown as a circumferential laterally projecting flange 14ˣ which fits up against the feed-tip cup 12 in an oil-tight manner and also serves to limit the inward movement of the feed tip; and it is also provided with projections 14ˣˣ or other means to receive a wrench or other implement for screwing it into and out of place. The provision of the removable plug 9 permits of the ready insertion of the feed-tip and its removal, and makes the feed-tip accessible at all times for tightening it up and for renewal when damaged, without dismantling the glass and its supports.

The upper feed-arm has annular flanges of like diameter projecting above and below and at right angles to it and constituting a socket 15, which is internally screwthreaded. In this socket is a screw follower 16 perforated transversely at 17 and chambered centrally at 18 to register respectively with the steam and oil passage 19 and the sight-feed glass. This follower has an operating stem 20 projecting up through a hub 21 which closes the upper end of the upper feed-arm socket 15, and said stem is squared at 22 or otherwise constructed to facilitate the operation of the follower.

The reinforced observation glass, which may be of any of the various forms shown in the several cases referred to herein, is herein shown at 23 as having a central portion 24 thicker than its ends 25 and with shoulders 26 at the meeting points of center and ends, and it is also provided with a central longitudinal oil passage 27. These shoulders receive the gaskets 28 and next to the gaskets and between them and the adjacent metal of the ledge or rim 13 and the follower are buffer washers 29, which last prevent the metal from cutting into the gaskets.

The glass is inserted by removing hub 21 and the follower 17, placing a buffer washer and then a gasket on the ledge or rim 13, then inserting the glass through the socket 15 on top of said gasket, then putting a gasket on the upper shoulder of the glass, then a buffer washer, and then screwing in the follower 16 and hub 21, until the follower exerts enough pressure to cause the gaskets to close all joints, steam, water and oil tight. The ends of the glass thus extend freely into the chamber 18 and into the feed-tip cup and are unaffected by pressure put upon the gaskets and may freely expand into these members.

The passage 19 leads to a port 30 controlled by a valve 31, and next to this port is the passage 32 which opens to the steam pipe 33 and to the oil connection with the part to be lubricated through the sight-feed. Hence, if the sight-feed is to be dismembered or is broken, it may be entirely cut out by closing the valves 31 and 10 and draining it of its contents through the port 34, which is controlled by the valve 35 in the nipple 36 which extends out from the lower feed-arm, and has the outlet 37. A peculiarity of this construction is that the exposed portion of the observation glass is wholly unobstructed, the glass being wholly exposed between the lower edge of the upper feed-arm socket 15 and the upper edge of the lower feed-arm's upper flange, and hence the illumination of the glass is complete and the facility of observation of the feed increased.

The construction herein described while specially designed for use with reinforced observation glasses of the kind specified, is capable of use with some forms of tubular glasses also.

While I have shown and described the follower 16 as screwthreaded in order to render it movable and adjustable in its socket, it is to be understood that the invention is not limited to this construction. It is essential, however, that the movement and adjustability of the follower should be effected by such means as will hold in use.

What I claim is:—

In a sight feed attachment for lubricators, the combination with the oil bowl, of upper and lower feed arms having flanges projecting toward each other, with a clear space between their adjacent edges, a screw-follower in the upper feed-arm, an interior ledge in the lower feed arm below the flange, a feed-tip cup below the ledge, a removable hub fitted in a hole in the lower feed arm beneath the feed tip cup, an observation glass arranged in the flanges and supported on gaskets interposed between the follower and glass near one end and between the ledge and glass near its other end, and a feed tip screwed into a hole in the feed tip cup from below said cup and having a stop collar adapted to fit fluid-tight against the bottom of the cup, said feed tip being accessible at all times by removal of the removable hub without dismantling the feed.

In testimony whereof I have hereunto set my hand this 20th day of September A. D. 1911.

FRANK W. EDWARDS.

Witnesses:
E. A. FINCKEL,
LILLIE M. PERRY.

---

Copies of this patent may be obtained for five cents each, by addressing the "Commissioner of Patents, Washington, D. C."